(12) United States Patent
Gower et al.

(10) Patent No.: US 8,780,962 B2
(45) Date of Patent: Jul. 15, 2014

(54) METHOD FOR EMULATING LOW FREQUENCY SERIAL CLOCK DATA RECOVERY RF CONTROL BUS OPERATION USING HIGH FREQUENCY DATA

(75) Inventors: James C. Gower, Hawthorne, NJ (US); Boris Radovcic, Rockaway, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 13/465,208

(22) Filed: May 7, 2012

(65) Prior Publication Data

US 2012/0287971 A1    Nov. 15, 2012

Related U.S. Application Data

(60) Provisional application No. 61/483,976, filed on May 9, 2011.

(51) Int. Cl.
*H04B 1/38* (2006.01)
*H04W 88/00* (2009.01)
*H04B 1/00* (2006.01)

(52) U.S. Cl.
CPC .................. *H04B 1/38* (2013.01); *H04W 88/00* (2013.01); *H04B 1/0003* (2013.01)
USPC .......................................................... 375/219

(58) Field of Classification Search
USPC .................................. 375/214, 219, 222, 268
See application file for complete search history.

(56) References Cited

U.S. PATENT DOCUMENTS

| | | | |
|---|---|---|---|
| 7,218,670 B1 * | 5/2007 | Lesea et al. .................... | 375/226 |
| 2008/0181287 A1 * | 7/2008 | Rofougaran ................... | 375/222 |
| 2011/0170560 A1 * | 7/2011 | Kyles et al. .................... | 370/465 |
| 2012/0179422 A1 * | 7/2012 | Webb et al. .................... | 702/187 |

* cited by examiner

*Primary Examiner* — Sam K Ahn
*Assistant Examiner* — Syed Haider
(74) *Attorney, Agent, or Firm* — Daniel J. Long (57) ABSTRACT

A system and method for emulating low frequency RF control bus operation using high frequency data is disclosed. In transmission path, the low frequency RFCB transmit data bytes are encoded and then up-sampled. The up-sampled data is then sent to hardware serializer for transmission. The resulting RF serial output stream appears to the external receiver to be encoded at low frequency even though the transceiver is operating at high frequency. In reception path, RFCB serial input data is de-serialized and then down-sampled. The down sampled data is then passed through custom byte-alignment logic and finally decoded. The transceivers are operated at high frequency but data is decoded and received as if it were at low rate. The FPGA serial transceiver are operated at a high frequency and sends each data bit a plurality of times to create a low effective data rate.

6 Claims, 7 Drawing Sheets

FIG.7

METHOD FOR EMULATING LOW FREQUENCY SERIAL CLOCK DATA RECOVERY RF CONTROL BUS OPERATION USING HIGH FREQUENCY DATA

CROSS-REFERENCE TO RELATED APPLICATIONS

This Application claims rights under 35 USC §119(e) from U.S. Application Ser. No. 61/483,976 filed May 9, 2011, the contents of which are incorporated herein by reference.

TECHNICAL FIELD

Embodiments are generally related to modular electronic systems. Embodiments are also related to methods for controlling data rates in modular electronic systems for example radio system. Embodiments are additionally related to a system and method for emulating low frequency Serial Clock Data Recovery RF control bus operation using high frequency data. Embodiments are additionally related to a method for emulating 500 Mbps RF Control Bus Operation using 2 Gbps Data Rate.

BACKGROUND OF THE INVENTION

Radio systems have many transceivers for providing radio communications to and from vehicles for example military vehicles and the like. A RF Control Bus (RFCB) is a bidirectional Serializer/Deserializer (SerDes) serial link which transmits Clock and data between transceivers and the external RF hardware such as for example power amplifiers and filters. The RF hardware sends transmit data to an encoder where the data is encoded and the encoded data is send to the transceiver for transmission to other vehicles. Such transceivers can also receive data from other vehicles. Such data is send to RF hardware such as filters after decoding. This invention can be used in any communication link between any type of devices.

Conventional radio systems use low speed serial transceivers such as for example a Dual Integrated Core Engine Transceiver (DICE-T). DICE-T utilize 10NCJ program which runs at 500 Mbps and has 8b/10b encoding. With such transceivers, the data processing such as encoding and decoding are performed at 500 Mbps data rate. Also certain convention GMR transceiver use a custom RF control bus which is a serial bus operating at low frequencies for example 500 Mbps.

Programmable logic devices (PLDs) exist as a well-known type of Integrated Circuit (IC) that can be programmed by a user to perform specified logic functions. The PLDs can be of programmable logic arrays (PLAs) or Complex Programmable Logic Devices (CPLDs). One type of PLD, called a Field Programmable Gate Array (FPGA), is popular because of a superior combination of capacity, flexibility, time-to-market, and cost.

Modern radio systems utilize high speed serial FPGA transceivers such as for example Altera Cyclone IV. The high speed serial FPGA transceivers run at higher frequencies than what is required in the 10NCJ program. For example Altera Cyclone IV utilized in the 10NCJ program run at a minimum data rate of 600 Mbps with 8b/10b encoding. Conventional GMR transceivers utilized on the 10NCJ program are required to run at 500 Mbps with 8b/10b encoding.

To perform proper encoding and decoding of the RFCB data, a unique approach to the 8b/10b encoding must be implemented which runs the transceivers at 2 Gbps. The Cyclone IV device transceiver does provide hardware 8b/10b encoders and decoders but these cannot be utilized since the transceiver is actually running at 2 Gbps but the encoding must be performed as if the data was 500. Mbps. A need exists, therefore, for a way to emulating low frequency Clock Data Recovery Serial control bus operation using high frequency data.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for modular electronic systems.

It is another aspect of the disclosed embodiments to provide for methods for controlling data rates in modular electronic systems for example radio system.

It is a further aspect of the present invention to provide for a system and method for emulating low frequency Serial Clock Data Recovery control bus operation using high frequency data.

It is another aspect of the present invention to provide for a method for emulating 500 Mbps RF Control Bus Operation using 2 Gbps Data Rate.

It is a yet another aspect of the present invention to provide for a system in which FPGAs serial transceivers runs at 2 Gbps and sends out each data bit four times to create an effective data rate of 500 Mbps.

It is a yet another aspect of the present invention to provide for a system in which FPGA serial transceivers are operated at a high frequency and sends out each data bit a plurality of times to create a low effective data rate.

The aforementioned aspects and other objectives and advantages can now be achieved as described herein. A system and method for emulating low frequency RF control bus operation using high frequency data is disclosed. In transmission path, the low frequency RFCB transmit data bytes are encoded and then up-sampled. The up-sampled data is then sent to a hardware serializer for transmission. The resulting RF serial output stream appears to the external receiver to be encoded at low frequency even though the transceiver is operating at a higher frequency.

In reception path, RFCB serial input data is de-serialized and then down-sampled. The down sampled data is then passed through custom byte-alignment logic and finally decoded. The transceivers are operated at high frequency but data is decoded and received as if it were at a lower rate. The FPGA serial transceiver are operated at a high frequency and sends each data bit a plurality of times to create a low effective data rate.

Current FPGAs such as the Altera Cyclone IV chosen for the 10NCJ program have high speed serial transceivers with 8b/10b encoding but the minimum data rate is 600 Mbps. To perform proper encoding and decoding of the RFCB data, a unique approach to the 8b/10b encoding is implemented which runs the transceivers at 2 Gbps. The Cyclone IV device transceiver does provide hardware 8b/10b encoders and, decoders but these cannot be used since the transceiver is actually running at 2 Gbps but the encoding must be performed as if the data was 500 Mbps. To correct for this, the 8b/10b hardware encoder and decoder are disabled by selecting the 'Enable Low-Latency PCS Datapath' option in the Altera Quartus II tool. A custom 8b/10b encoder/decoder running at 50 MHz is implemented using the Quartus II Mega-Wizard to provide the encoding/decoding for the 500 Mbps rate. The custom bit alignment, word alignment, and 8b/10b encoding/decoding logic is implemented outside the transceiver core.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

DETAILED DESCRIPTION

The particular values and configurations discussed in these non-limiting examples can be varied and are cited merely to illustrate at least one embodiment and are not intended to limit the scope thereof.

Figure 1:
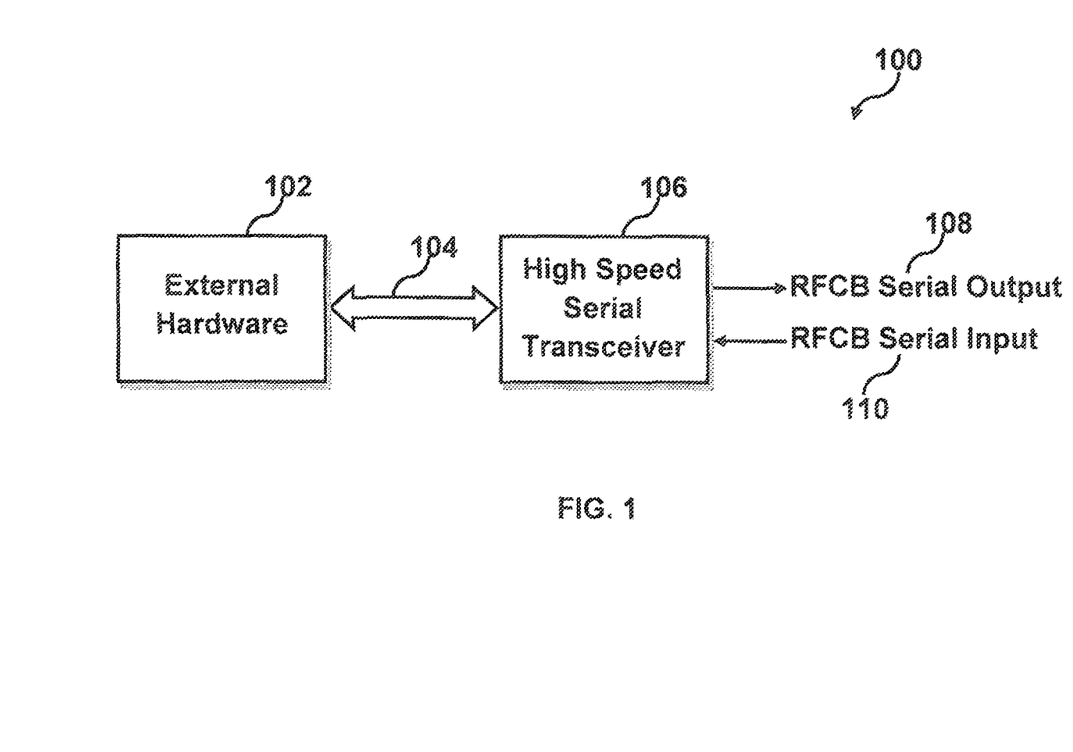
FIG. 1 illustrates a simple block diagram of an apparatus comprising high speed serial transceiver connected to external hardware, in accordance with the disclosed embodiments.

FIG. 1 illustrates a simple block diagram of an apparatus 100 comprising high speed serial transceiver 106 connected to external hardware 102, in accordance with the disclosed embodiments. The system 100 is utilized for emulating low frequency Radio Frequency Control Bus RFCB 104 operation using high frequency data. Such system 100 can be utilized in an electronics system, for example, a modular electronic radio system for transmission and reception of data. The RF Control Bus (RFCB) 104 is a bidirectional serial link between the high speed serial transceiver 106 and external hardware 102. The high speed serial transceiver 106 can be for example FPGA transceivers such as Altera Cyclone IV. Such high speed serial transceiver 106 runs at minimum data rate of 500 Mbps and have 8b/10b encoding, but RFCB 104 operates at low data rate for example 500 Mbps. Each data bit is sent a plurality of times to create a low effective data rate. The system 100 can be utilized for emulating a low frequency RFCB 104 operation using a high frequency data using a serial transceiver 106 operating at a high frequency and sending out each data bit a plurality of times to create a low effective data rate. RFCB serial output data 108 for transmission and RFCB serial input data 110 received by serial transceiver 106 are shown in FIG. 1.

To perform proper encoding and decoding of the RFCB data, a unique approach to the encoding must be implemented which runs the transceivers at high frequency. The high speed serial transceiver does provide hardware encoders and decoders but these cannot be used since the transceiver is actually running at high frequency but the encoding and decoding must be performed at low data rate. To correct for this, the hardware encoder and decoder in the transceiver are disabled by selecting the suitable options in Programmable logic devices (PLDs).

Figure 2:
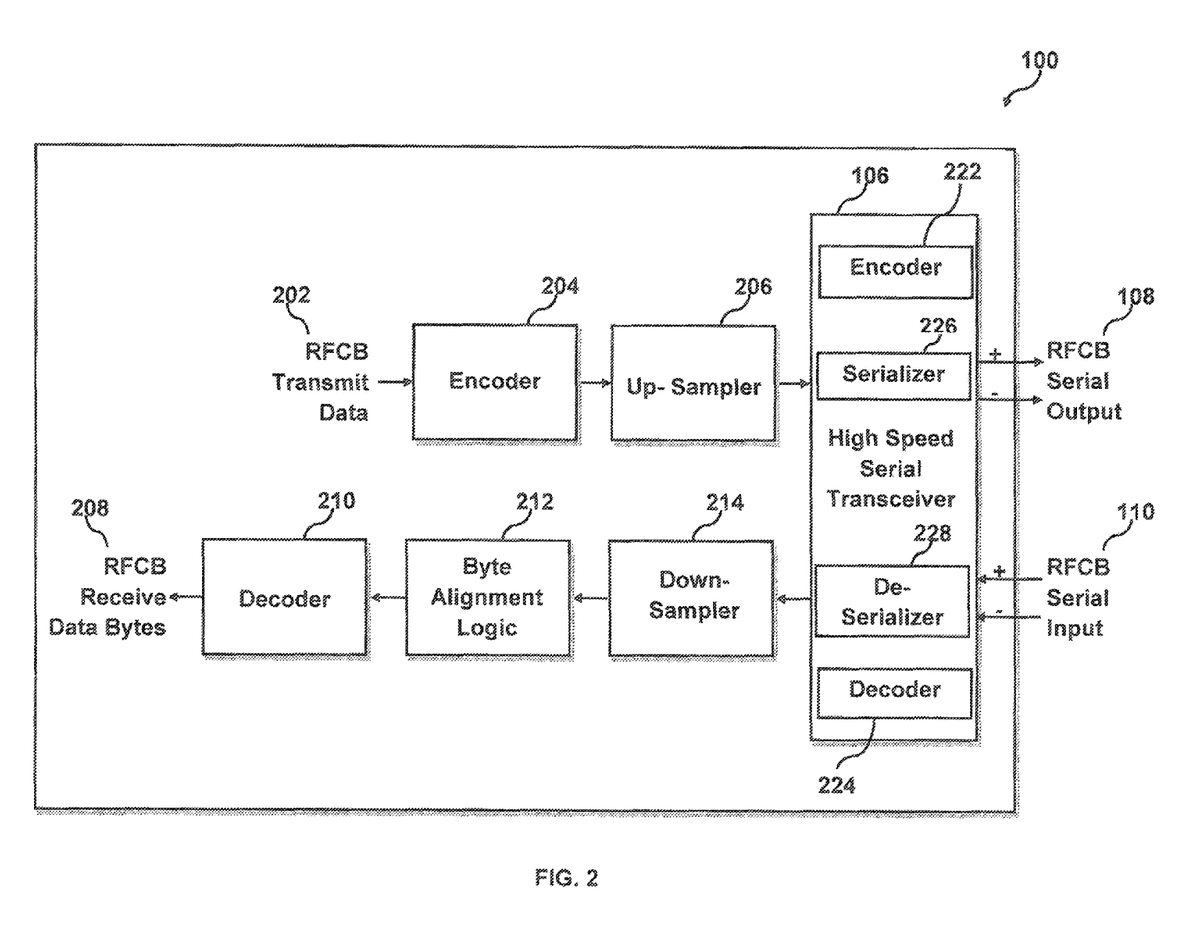
FIG. 2 illustrates a block diagram of the apparatus depicted in FIG. 1 comprising FPGA transceiver utilized for emulating low frequency RF control bus operation using high frequency data, in accordance with the disclosed embodiments.

Referring to FIG. 2, the apparatus 100 comprising the transceiver 106 utilized for emulating low frequency RFCB operation using high frequency data is disclosed. The transceiver 106 is the high speed serial FPGA transceiver. In the transmission path, rather than using the hardware encoder 222 in transceiver 106, a custom encoder 204 running at low frequency is implemented using the PLD to provide the encoding for the low data rate. The RFCB transmit data 202 is encoded and then up-sampled a plurality of times by up-sampler 206. The up-sampled data is sent to the hardware serializer 226 and then transmitted at high frequency. The resulting serial stream is the RFCB serial output 108 which appears to the external receiver (not shown) to be encoded at low data rate even though the transceiver 106 is operating at high frequency.

In the reception path, the RFCB serial input data 110 is first de-serialized by de-serializer 228 and then down-sampled a plurality of times by down-sampler 214. The down sampled data is then passed through custom byte-alignment logic 212. Finally, the received data bytes are decoded with a custom decoder 210 generated using the PLD to provide the decoding for the low data rate. Similar to the transmit path, the transceiver 106 is operating at high frequency but the data is decoded and received as if it were at low rate. Rather than using the hardware decoder 224 in transceiver 106, a custom decoder 210 running at low frequency is implemented using the PLD to provide the decoding for the low data rate. After decoding, the RFCB receive data bytes 208 are obtained from the decoder 210.

Figure 3:
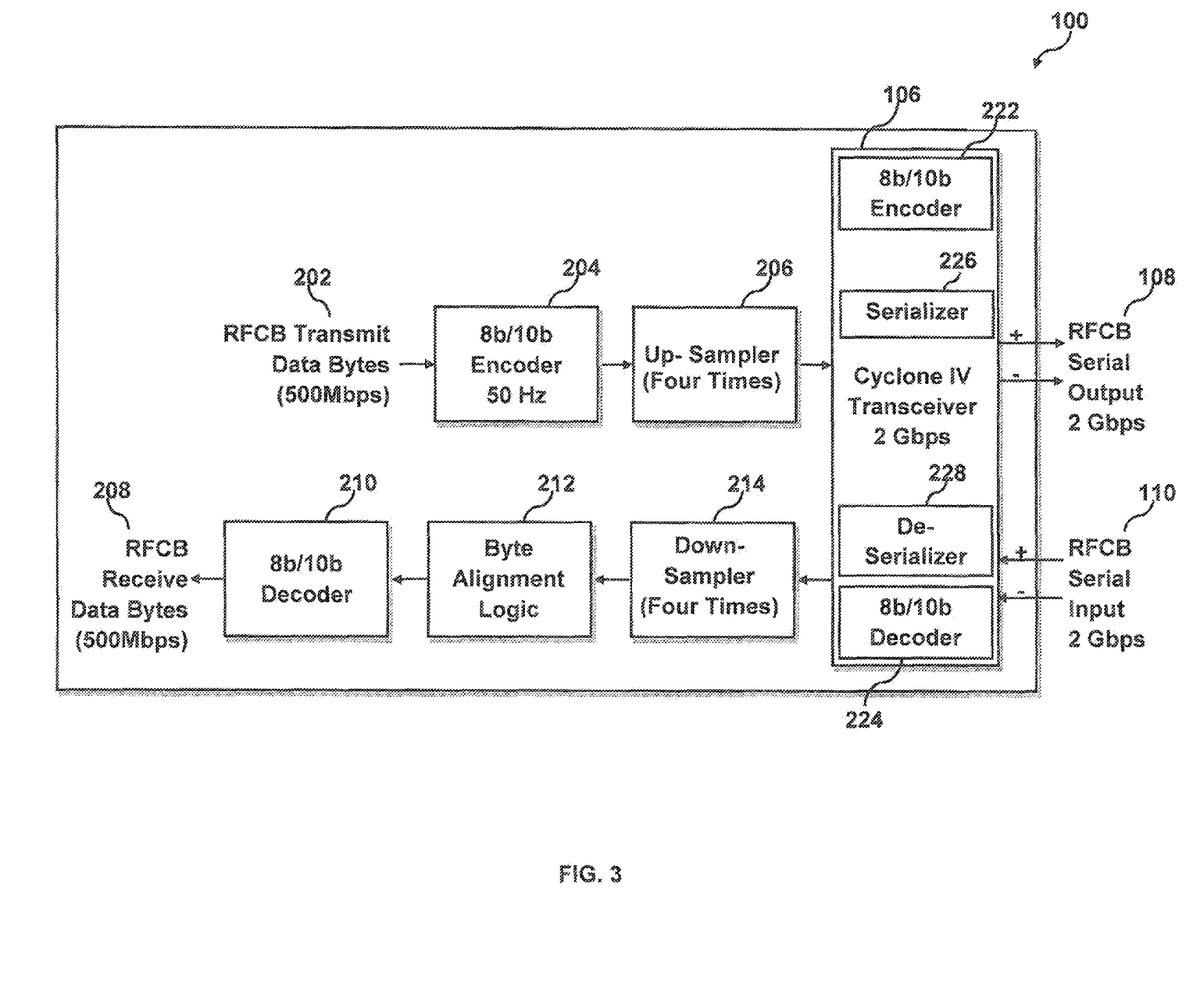
FIG. 3 illustrates a block diagram of the apparatus depicted in FIG. 1 comprising Altera Cyclone IV FPGA transceiver utilized for emulating low frequency RF control bus operation using high frequency data, in accordance with the disclosed embodiments.

FIG. 3 illustrates a block diagram of a system comprising the transceiver 106 utilized for emulating low frequency RFCB operation using high frequency data, in accordance with the disclosed embodiments. The transceiver 106 is the high speed serial FPGA transceiver such as Altera Cyclone IV. In the transmit path, rather than using the hardware encoder 222, a custom 8b/10b encoder 204 running at 50 MHz is implemented using the Quartus II Mega-Wizard to provide the encoding for the 500 Mbps rate. The RFCB transmit data 202 is encoded and then up-sampled four times by up-sampler 206. The up-sampled data is sent to the hardware-serializer 226 and then transmitted at 2 Gbps. The resulting serial stream is the RFCB serial output 108 which appears to the external receiver (not shown) to be encoded at low data rate even though the transceiver 106 is operating at high frequency.

In the reception path, the RFCB serial input data 110 is first de-serialized by de-serializer 228 and then down-sampled four times by down-sampler 214. The down sampled data is then passed through custom byte-alignment logic 212. Finally, the received data bytes are decoded with a custom 8b/10b decoder 210 generated using the Quartus II Mega-Wizard to provide the decoding for the 500 Mbps rate. Similar to the transmit path, the transceiver 106 is operating at 2 Gbps but the data is decoded and received as if it were at 500 Mbps.

Figure 4:
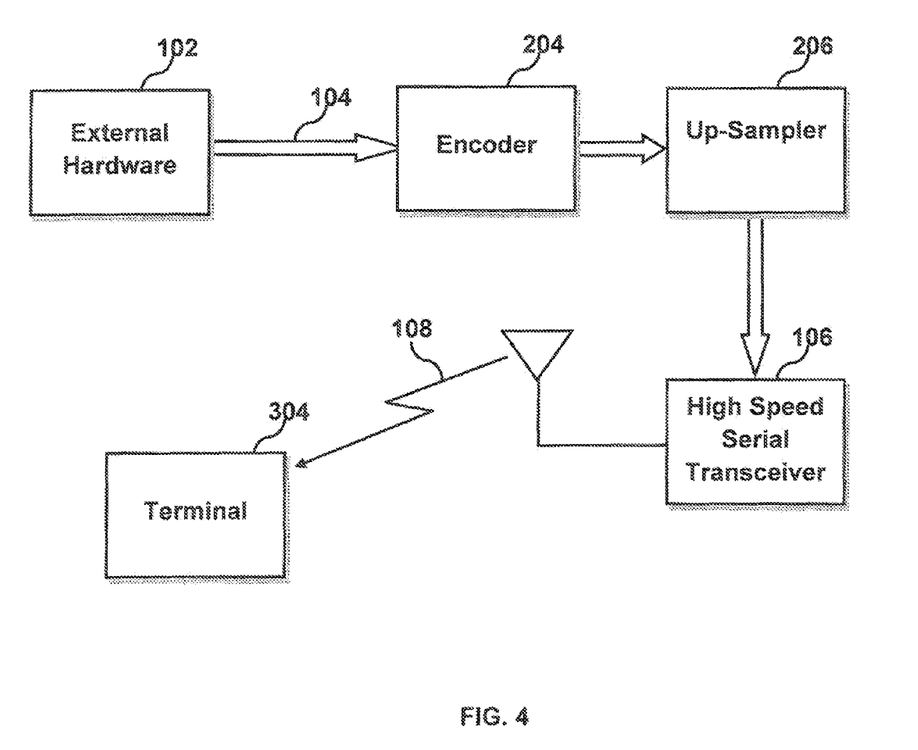
FIG. 4 illustrates a block diagram of the apparatus depicted in FIG. 2 utilized for data transmission, in accordance with the disclosed embodiments.

FIG. 4 illustrates a block diagram of the apparatus 100 depicted in FIG. 2 utilized for data transmission, in accordance with the disclosed embodiments. The RFCB transmit data bytes 202 depicted in FIG. 2 from external hardware 102 are transmitted to an encoder 204 through RFCB 104. The encoder 204 encodes the data and the up-sampler 206 increase the sampling rate of the data. The transceiver 106 operating at high frequency serializes the data and transmits the emulated RFCB transmit data 108 to a terminal 304. The external hardware 102 can include various devices or components or modules that generate RFCB transmit data 108 such as for example power amplifier.

Figure 5:
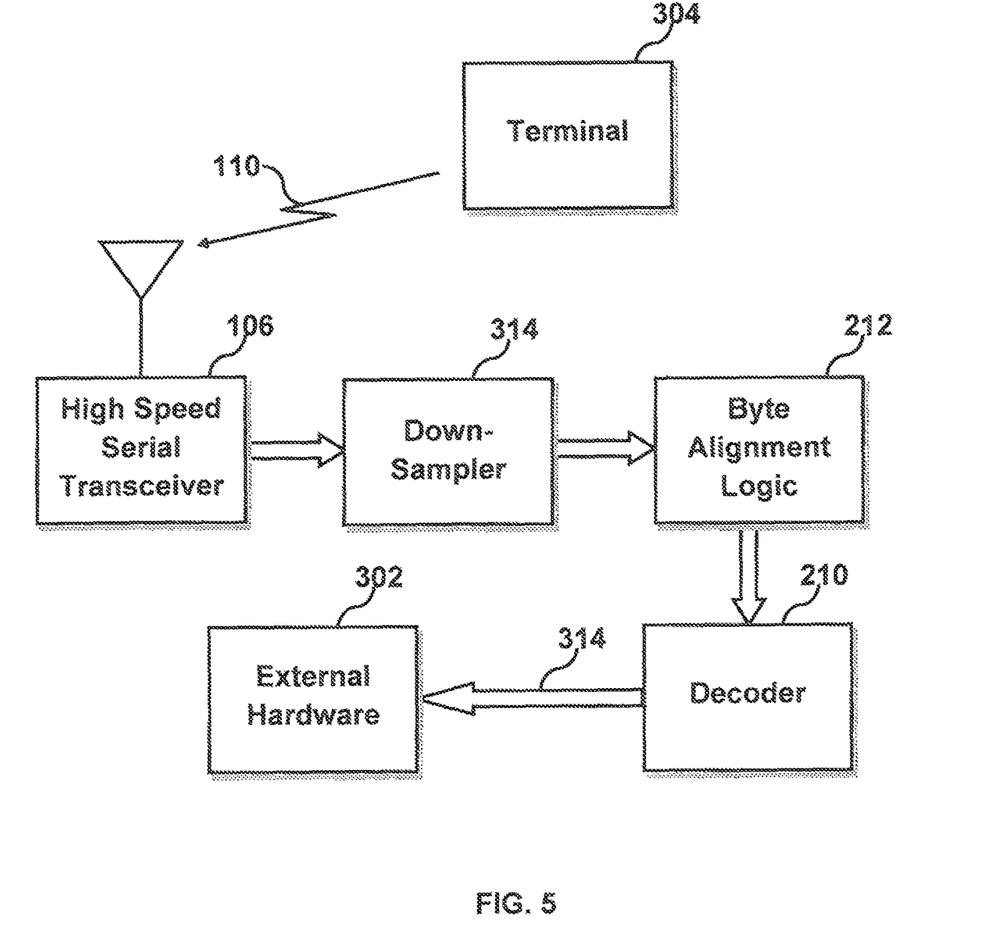
FIG. 5 illustrates a block diagram of the apparatus depicted in FIG. 2 utilized for data reception, in accordance with the disclosed embodiments.

FIG. 5 illustrates a block diagram of the apparatus 100 depicted in FIG. 2 utilized for data reception, in accordance with the disclosed embodiments. The high speed serial transceiver 106 receives the RFCB serial input data 110 from a terminal 304. The transceiver 106 de-serializes the data and send to the down-sampler 314. The down sampler 314 decreases the sampling rate of the data and then the byte alignment logic 212 performs the byte alignment of the data. Then the data is decoded by the decoder 210 and then send to the external hardware 302. The external hardware 102 can include various devices or components or modules that process the RFCB receive data 110 such as for example filters.

In general, encoder converts information from one format or code to another, for the purposes of standardization, speed, secrecy, security, or saving space by shrinking size. Up-sampling is the process of increasing the sampling rate of a signal and serialization is the process of converting a data structure or object state into a format that can be stored for example, in a file or memory buffer, or transmitted across a network connection link. The RFCB transmit data 202 is encoded, up-sampled and then serialized for transmission.

The extraction of data structure from a series of bytes is called deserialization. In signal processing, downsampling is the process of reducing the sampling rate of a signal. This is usually done to reduce the data rate or the size of the data. High-speed serial signaling is becoming an increasingly important form of signaling between electronic devices. Typically the data represent bytes of information that are being transmitted one after another. The usual definition of a byte is eight bits, but as used herein "byte" can refer to any plural number of bits such as eight bits, nine bits, ten bits, eleven bits, or fewer or more than these numbers of bits. When the data is received, one task that the receiving circuitry must typically perform is to find the boundaries between the successive bytes in the received serial bit stream. This may be referred to as "byte alignment" or "byte synchronization". A decoder is a device which does the reverse operation of an encoder, undoing the encoding so that the original information can be retrieved. The RFCB serial data 110 is de-serialized, down-sampled and byte aligned and then serialized in reception path.

Figure 6:
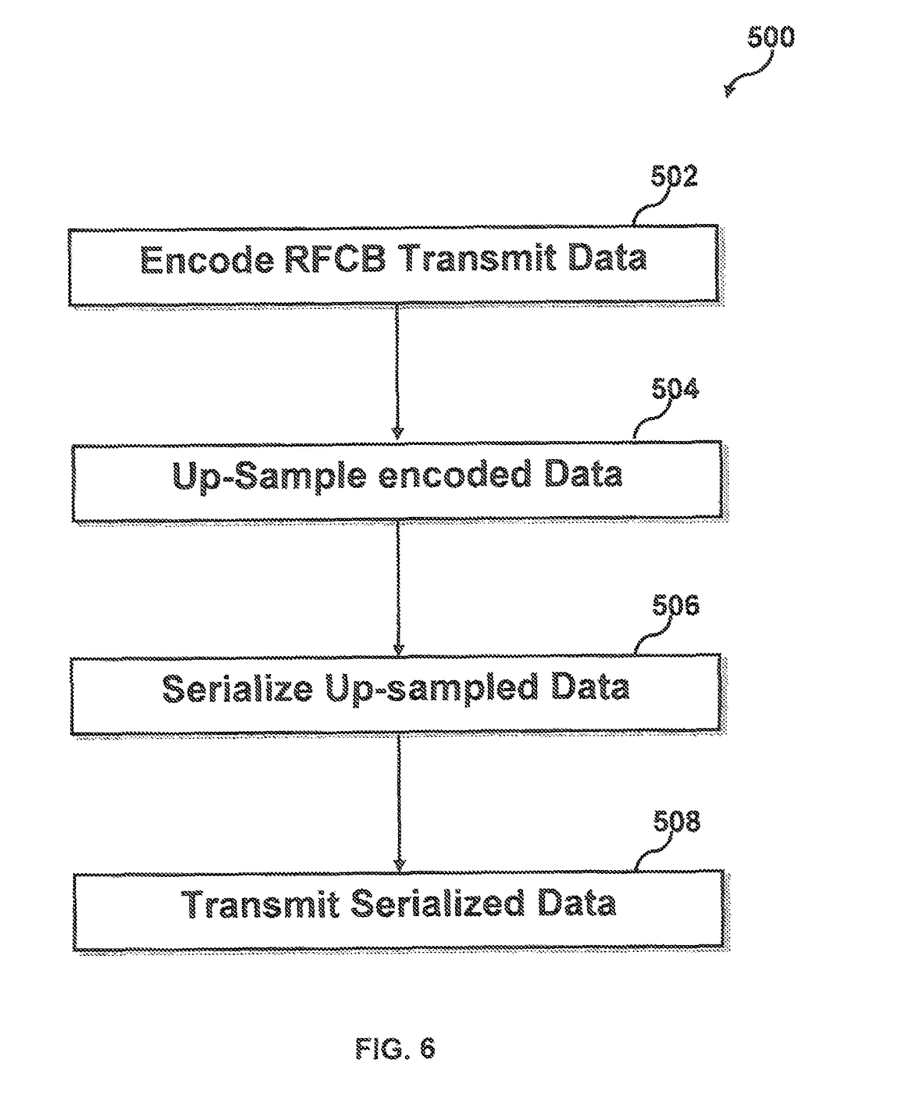
FIG. 6 illustrates a flow chart showing a method of emulating low frequency RF control bus operation using high frequency data for data transmission, in accordance with the disclosed embodiments.

FIG. 6 illustrates a flow chart 500 showing a method of emulating low frequency RF control bus operation using high frequency data for data transmission, in accordance with the disclosed embodiments. The RFCB data to be transmitted is first encoded at low frequency as depicted at block 502. Then the data is up-sampled a plurality of times by the up-sampler as illustrated at block 504. As said at block the up-sampled data is serialized and then transmitted to other terminal at higher frequency by utilizing the high speed serial transceiver as depicted at block 506 and 508 respectively. In the transmit path, rather than using the hardware encoder in the transceiver, a custom encoder running at low frequency is implemented using the PLD to provide the encoding for the low data rate.

Figure 7:
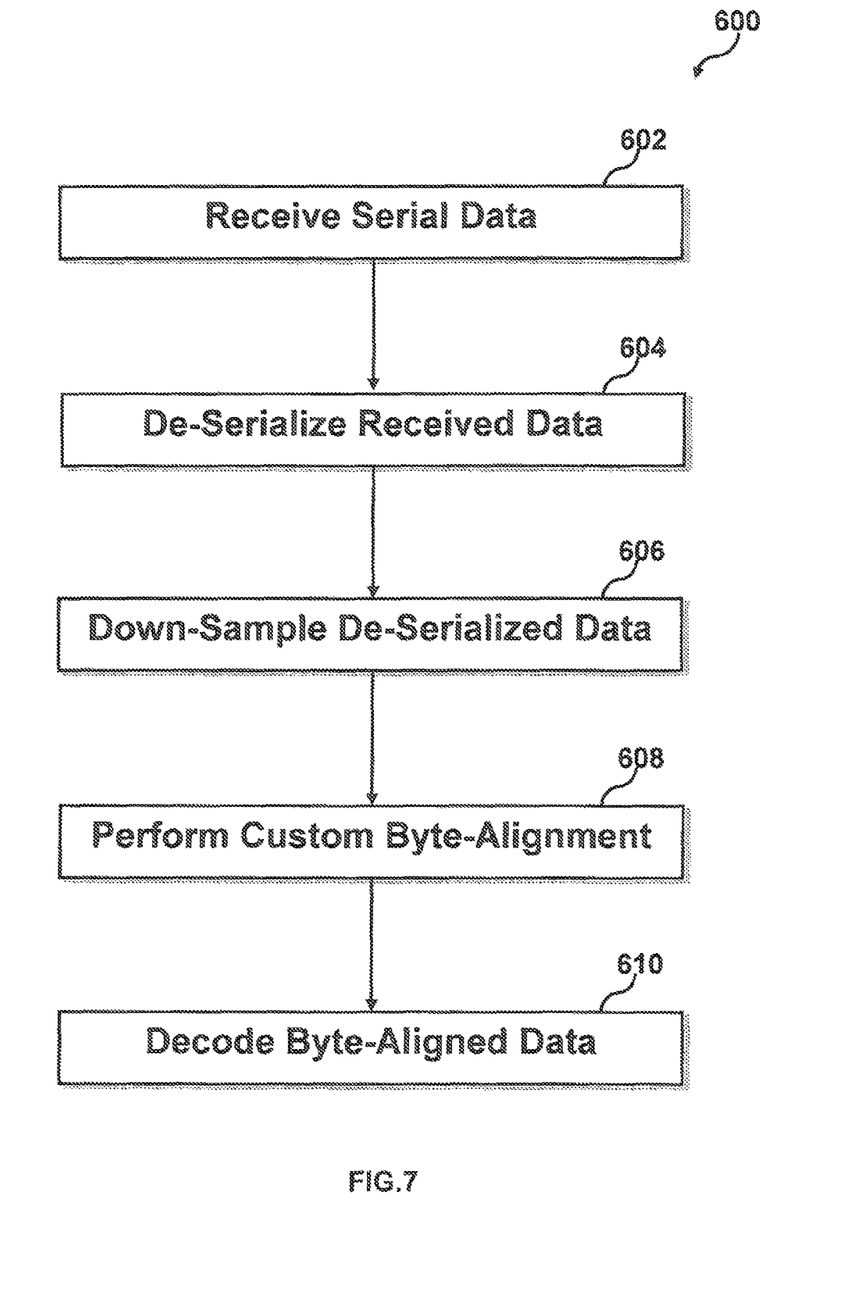
FIG. 7 illustrates a flow chart showing a method of emulating low frequency RF control bus operation using high frequency data for data reception, in accordance with the disclosed embodiments.

FIG. 7 illustrates a flow chart 600 showing a method of emulating low frequency RF control bus operation using high frequency data for data reception, in accordance with the disclosed embodiments. The RFCB serial input data is received from other terminal and then de-serialized at high frequency by utilizing the high speed serial transceiver as illustrated at block 602 and 604. Then the data is down-sampled a plurality of times and custom byte alignment is performed as illustrated at block 606 and 608. Then as said at block 610, the data is decoded at low frequency and send to external hardware for further processing. Rather than using the hardware decoder in the transceiver, a custom decoder running at low frequency is implemented using the PLD to provide the encoding for the low data rate. This allows emulation of low frequency Radio Frequency (RF) control bus operation using high frequency data.

It will be appreciated that variations of the above disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for emulating a low frequency Radio Frequency control bus operation using high frequency data for transmission in a radio system by utilizing a high speed Field Programmable Gate Array serial transceiver comprising:

processing low frequency data from an external hardware for transmission, wherein processing of low frequency data comprises encoding by implementing a custom encoder outside a transceiver core of said transceiver, running at low frequency using a programmable logic device to provide the encoding for low data rate;

providing a hardware encoder inside the transceiver core, and disabling the hardware encoder in the transceiver core by selecting options in the programmable logic device;

increasing sampling rate of data a plurality of times to create a low effective data rate, wherein said transceiver operates at high frequency and data processing is performed at low frequency; and serializing data and sending data to a terminal using hardware serializer present in the transceiver core of said transceiver, wherein processing and increasing sampling rate of data are performed outside the transceiver core in said transceiver.

2. A method for emulating a low frequency Radio Frequency control bus operation using high frequency data for reception in a radio system by utilizing a high speed Field Programmable Gate Array serial transceiver comprising:

receiving and de-serializing data from a terminal using a hardware de-serializer present in a transceiver core of said transceiver;

decreasing sampling rate of data a plurality of times; and processing low frequency data to obtain data transmitted from said terminal which comprises byte alignment and decoding by implementing a custom decoder outside the transceiver core of said transceiver, a hardware decoder present in the transceiver core of said transceiver, wherein the hardware decoder is disabled by selecting options in a programmable logic device (PLD), and the custom decoder is configured to run at low frequency using the programmable logic device to provide decoding for low data rate, wherein said transceiver operates at high frequency and data processing is performed at low frequency and processing of low frequency data and decreasing sampling rate of data are performed outside the transceiver core in said transceiver.

3. A high speed Field Programmable Gate Array serial transceiver device having a transceiver core for emulating low frequency radio frequency control bus operation using high frequency data for transmission in a radio system comprising:
- a processing unit for processing low frequency data from external hardware for transmission, wherein said processing unit comprises a custom encoder outside a transceiver core of said transceiver;
- a hardware encoder inside the transceiver core, wherein the hardware encoder in the transceiver core is disabled by selecting options in a programmable logic device (PLD), wherein the custom encoder is configured to run at low frequency using a programmable logic device to provide encoding for low data rate;
- an up-sampler for increasing sampling rate of data a plurality of times to create a low effective data rate, wherein said transceiver operates at high frequency and data processing is performed at low frequency; and
- a hardware serializer present in the transceiver core of said transceiver for serializing data and sending the serialized data to a terminal, wherein said processing unit and up-sampler are incorporated outside the transceiver core in said transceiver.

4. A high speed Field Programmable Gate Array serial transceiver device having a transceiver core for emulating low frequency radio frequency control bus operation using high frequency data for reception in a radio system comprising:
- a hardware de-serializer present in transceiver core of said transceiver operating at high frequency for receiving data from a terminal and de-serializing data before processing;
- a down-sampler for decreasing sampling rate of data a plurality of times, wherein said transceiver operates at high frequency and data processing is performed at low frequency;
- a custom byte-alignment logic for byte alignment of the down sampled data;
- a processing unit for processing low frequency data to obtain data, wherein said processing unit comprises a custom decoder running at low frequency using a programmable logic device to provide decoding for low data rate, wherein said processing unit and down-sampler are incorporated outside the transceiver core in said transceiver; and
- a hardware decoder inside the transceiver core, wherein the hardware decoder in the transceiver core is disabled by selecting options in the programmable logic device.

5. A high speed Field Programmable Gate Array serial transceiver device having a transceiver core for emulating low frequency radio frequency control bus operation using high frequency data in a radio system comprising:
- a processing unit for processing low frequency data from external hardware for transmission, wherein said processing unit comprises a custom encoder running at low frequency using a programmable logic device (PLD) to provide encoding for low data rate;
- an up-sampler for increasing sampling rate of data a plurality of times to create a low effective data rate, wherein said transceiver operates at high frequency and data processing is performed at low frequency;
- a transceiver circuitry comprising a hardware encoder inside the transceiver core which is disabled by selecting options in a programmable logic device, a hardware decoder, a hardware serializer, and a hardware de-serializer for serializing data before transmission and de-serializing data before processing and sending data to and receiving data from a terminal and, wherein said processing unit and said up-sampler are incorporated outside the transceiver circuitry and the hardware encoder and decoder are disabled;
- a down-sampler for decreasing sampling rate of data a plurality of times, wherein said transceiver operates at high frequency and data processing is performed at low frequency;
- a custom byte-alignment logic for byte alignment of be down sampled data; and
- another processing unit for processing low frequency data to obtain data, wherein said processing unit comprises a custom decoder running at low frequency using the programmable logic device to provide decoding for low data rate, wherein said another processing and up-sampler are incorporated outside the transceiver circuitry.

6. A method for emulating a low frequency Radio Frequency control bus operation using high frequency data in a radio system by utilizing a high speed Field Programmable Gate Array serial transceiver having a transceiver core comprising:
- processing a low frequency data from an external hardware for transmission, wherein processing of low frequency data comprises encoding by implementing a custom encoder running at low frequency using a programmable logic device to provide the encoding for low data rate and disabling a hardware encoder positioned inside the transceiver core which is disabled by selecting options in the programmable logic device;
- increasing sampling rate of data a plurality of times to create a low effective data rate, wherein said transceiver operates at high frequency and data processing is performed at low frequency;
- serializing data and sending data to a terminal, wherein processing and increasing sampling of data are performed outside the transceiver core in said transceiver;
- receiving and de-serializing data from the terminal;
- decreasing sampling rate of data a plurality of times; and
- processing low frequency data to obtain data transmitted from said terminal comprising byte alignment and decoding by implementing a custom decoder running at low frequency using the programmable logic device to provide decoding for low data rate, wherein the transceiver operates at high frequency and data processing is performed at low frequency and processing of low frequency data are performed outside the transceiver core in said transceiver.

* * * * *